US009890848B2

(12) United States Patent
Girardot et al.

(10) Patent No.: US 9,890,848 B2
(45) Date of Patent: Feb. 13, 2018

(54) MOTOR VEHICLE DIFFERENTIAL COMPRISING A HOUSING PROVIDED WITH OIL RECOVERY MEANS

(71) Applicant: RENAULT s.a.s., Boulogne-Billancourt (FR)

(72) Inventors: Vincent Girardot, Igny (FR); Damien Coulon, Fontenay aux Roses (FR); Mathieu Leleu, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/441,281

(22) PCT Filed: Oct. 14, 2013

(86) PCT No.: PCT/FR2013/052447
§ 371 (c)(1),
(2) Date: May 7, 2015

(87) PCT Pub. No.: WO2014/076382
PCT Pub. Date: May 22, 2014

(65) Prior Publication Data
US 2015/0276043 A1   Oct. 1, 2015

(30) Foreign Application Priority Data

Nov. 13, 2012   (FR) ...................................... 12 60762

(51) Int. Cl.
*F16H 57/04*    (2010.01)
*F16H 48/08*    (2006.01)

(52) U.S. Cl.
CPC ..... *F16H 57/0483* (2013.01); *F16H 57/0421* (2013.01); *F16H 57/0423* (2013.01); *F16H 57/0457* (2013.01); *F16H 48/08* (2013.01)

(58) Field of Classification Search
CPC .......................... F16H 57/0423; F16H 57/0424
See application file for complete search history.

(56) References Cited

U.S. PATENT DOCUMENTS 3,138,222 A * 6/1964 Dames ................ F16H 57/0421
184/11.2
5,197,929 A    3/1993 Scheiber et al.
(Continued)

FOREIGN PATENT DOCUMENTS

DE       1 264 974       3/1968
GB         590 867       7/1947
(Continued)

OTHER PUBLICATIONS

Machine translation of JP2005106178, filed Sep. 5, 2016.*
(Continued)

*Primary Examiner* — Tisha Lewis
(74) *Attorney, Agent, or Firm* — Oblon, McClelland, Maier & Neustadt, L.L.P.

(57) ABSTRACT

A motor vehicle differential including a housing holding a differential mechanism including a ring gear attached to a cage of planetary gears, the housing including a first half-housing that is configured to accommodate the cage of gears and at least a part of the ring gear, and a second half-housing closing the first half-housing, the first half-housing including a chamber that accommodates at least a part of the ring gear, and that includes at least a main transverse wall adjacent to a transverse face of the ring gear. The first half-housing includes a mechanism recovering the oil splashed onto the wall and a mechanism redirecting the recovered oil to the cage of planetary gears.

10 Claims, 4 Drawing Sheets

(56) References Cited

U.S. PATENT DOCUMENTS

| | | | |
|---|---|---|---|
| 7,445,088 B2* | 11/2008 | Watanabe | F16H 57/0427 |
| | | | 184/13.1 |
| 8,109,174 B2* | 2/2012 | Hilker | F16H 57/0421 |
| | | | 184/6.12 |
| 8,152,675 B2* | 4/2012 | Altvaten | F16H 57/0434 |
| | | | 184/11.1 |
| 9,057,431 B2* | 6/2015 | Okada | F16H 57/0483 |
| 9,115,798 B2* | 8/2015 | Sigl | F16H 57/0409 |
| 2007/0191168 A1* | 8/2007 | Corless | F16H 57/0483 |
| | | | 475/160 |
| 2011/0192245 A1* | 8/2011 | Shioiri | F16H 57/0423 |
| | | | 74/467 |
| 2014/0054114 A1* | 2/2014 | Isomura | F16H 57/0423 |
| | | | 184/6.12 |

FOREIGN PATENT DOCUMENTS

| | | | | |
|---|---|---|---|---|
| JP | 2005106178 A | * | 4/2005 | ............ F16H 57/00 |
| WO | 90 11907 | | 10/1990 | |

OTHER PUBLICATIONS

International Search Report dated Dec. 10, 2013 in PCT/FR13/052447 Filed Oct. 14, 2013.

French Search Report dated May 13, 2013 in Application No. FR 1260762 Filed Nov. 13, 2012.

* cited by examiner

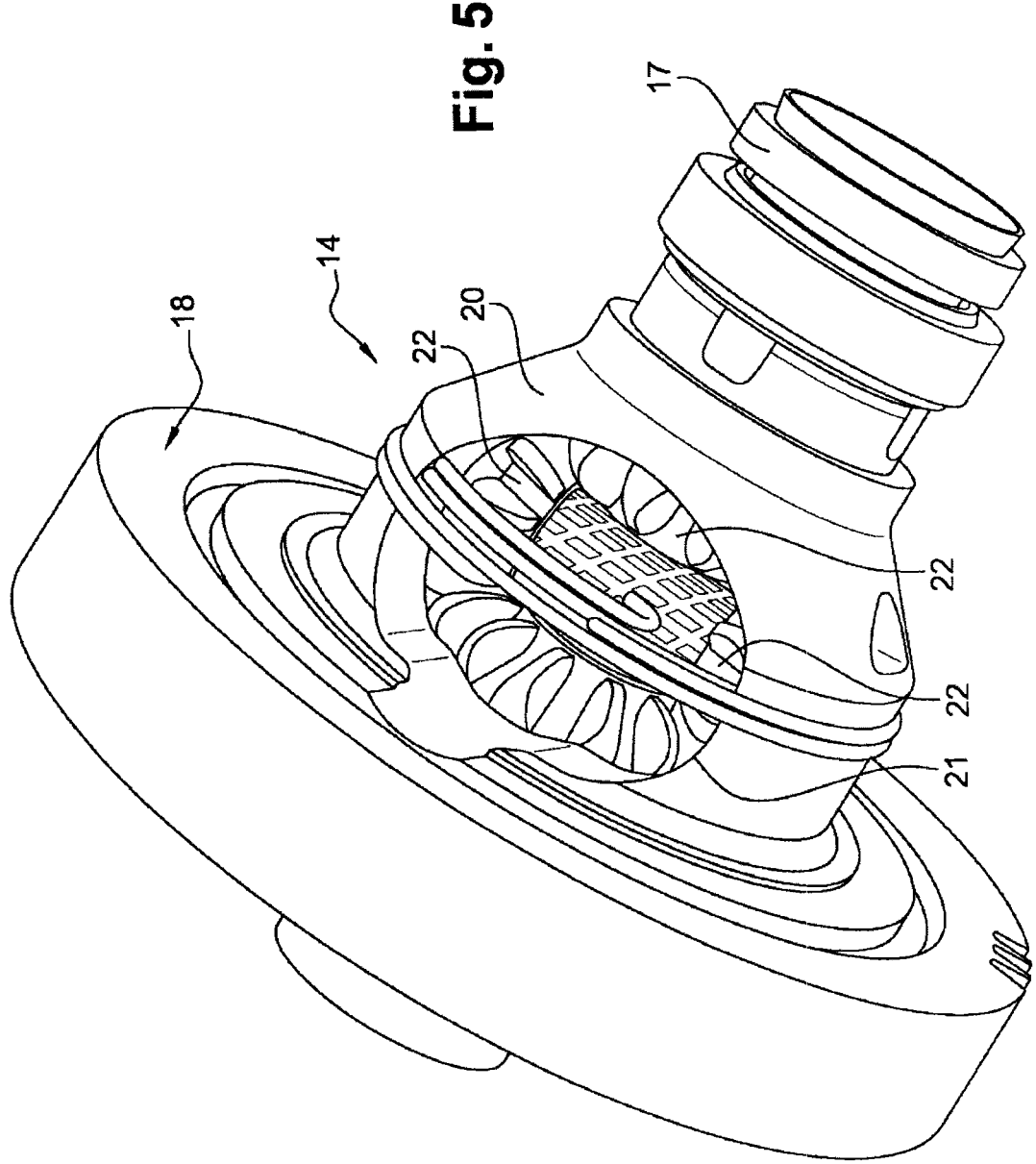

MOTOR VEHICLE DIFFERENTIAL COMPRISING A HOUSING PROVIDED WITH OIL RECOVERY MEANS

BACKGROUND OF INVENTION

Field of Invention

The invention relates to a motor vehicle differential.

Related Art

The invention relates more specifically to a motor vehicle differential comprising a casing and a substantially axial differential mechanism, which is supported in the casing by two opposing bearings, and which includes at least one ring gear adjoining a cage of planetary gears, said casing including, on the one hand, a first half-casing which includes a first bearing and is capable of accommodating the cage of gears and at least a part of the ring gear, and, on the other hand, a second half-casing which includes a second bearing and is capable of closing the first half-casing, the first half-casing including at least one housing capable of accommodating the cage of gears and a chamber, into which said housing opens, which chamber accommodates at least a part of the ring gear, and which includes at least a main transverse wall adjacent to a transverse face of the ring gear.

Many examples of differentials of this type are known.

Conventionally, once the differential mechanism has been installed in the two half-casings, and the two half-casings have been brought together to form a casing, said casing is filled with a lubricating oil which permits the splash lubrication of the cage of gears to be assured.

For this purpose, the level of the oil in the casing is set essentially at the level of the axis of the differential mechanism or the axis of rotation of the ring gear, according to the rule which stipulates that the level of lubricant is set at the level of the lowest rotating element.

As long as the differential rotates at a speed below a predetermined speed, the lubrication of the cage of gears is assured by splashing, the cage of gears being immersed in the lubricating oil. For this purpose, the cage is an open cage which permits the oil to bathe the gears.

However, such an approach suffers from a disadvantage as soon as the differential rotates at high speeds.

In fact, above a predetermined speed, the lubricating oil is centrifuged by the ring gear and is thrown against the walls of the casing and, in particular, against the walls of the half-casings, from where it flows slowly by trickling, returning only slowly toward the bottom of the housing. As a result, the level of oil present in the housing accommodating the cage of gears becomes insufficient and incapable of assuring the splash lubrication of said cage of gears.

This lack of lubrication, even if the oil level appears to be satisfactory when stationary, may result sooner or later in the destruction of the rotating elements of the differential due to a shortage of oil.

SUMMARY OF THE INVENTION

The invention addresses this disadvantage by proposing a differential including means for recovering the thrown oil and means for redirecting this oil toward the cage of gears.

To this end, the invention proposes a motor vehicle differential of the type described previously, characterized in that the first half-casing includes:

- a means for recovering the oil thrown onto the wall by the ring gear, and
- a means for redirecting the recovered oil into the cage of planetary gears.

According to other characterizing features of the invention:

- the means for recovering the oil includes a first recess, which opens into the main wall, and which includes two axial radial walls, one transverse radial wall and two interior and exterior tangential walls which delimit an oil reservoir,
- the means for redirecting the recovered oil includes a second recess, adjoining the first recess, communicating with said first recess, which includes a passage facing toward the cage of planetary gears,
- a rib arranged in the extension of a first axial radial wall projects from the main wall in order to collect the thrown oil and to direct it into the reservoir of the first recess,
- a second axial radial wall extends radially for a reduced part of the radial dimension of the recess, in order to delimit, together with the opposite exterior tangential wall, an oil passageway communicating with the second recess,
- the second recess opens into the main wall, and it includes:
  - the second axial radial wall common with the first recess,
  - a transverse radial wall,
  - an exterior tangential wall,
  - the passage facing toward the axis of the mechanism,
  - a third axial wall, which includes an axial radial exterior part and an interior part forming a predetermined angle with the radial direction, of which an interior edge coincides with at least one edge of the passage, in order to channel the collected oil toward the cage of planetary gears,
- the interior part of the third axial wall of the second recess forms an angle of substantially 10 degrees with the radial direction,
- the passage formed in the interior tangential wall exhibits substantially the form of a trapezoidal cutout including a tangential edge and two edges, of which one coincides with the interior edge of the interior part of the third axial wall.

Other characterizing features and advantages of the invention will be appreciated from a perusal of the following detailed description, for the understanding of which reference is made to the accompanying drawings, in which:

BRIEF DESCRIPTION OF THE DRAWINGS

FIG. 5 is a view in perspective of the differential mechanism.

DETAILED DESCRIPTION

In the following description, identical numbers or references are used to designate identical components or components having similar functions.

The expression "axial direction" is used to denote the direction corresponding to the axis of the differential mechanism.

The expression "radial direction" is used to denote any direction perpendicular to the axial direction.

The expression "transverse direction" is used to denote any direction comprised in a plane perpendicular to the axial direction.

The expression "tangential direction" is used to denote any direction comprised in a plane perpendicular to the radial direction.

The expression "interior" is used to designate an element close to the axis of rotation of the differential mechanism.

The expression "exterior" is used to designate an element remote from the axis of rotation of the differential mechanism.

Figure 4:
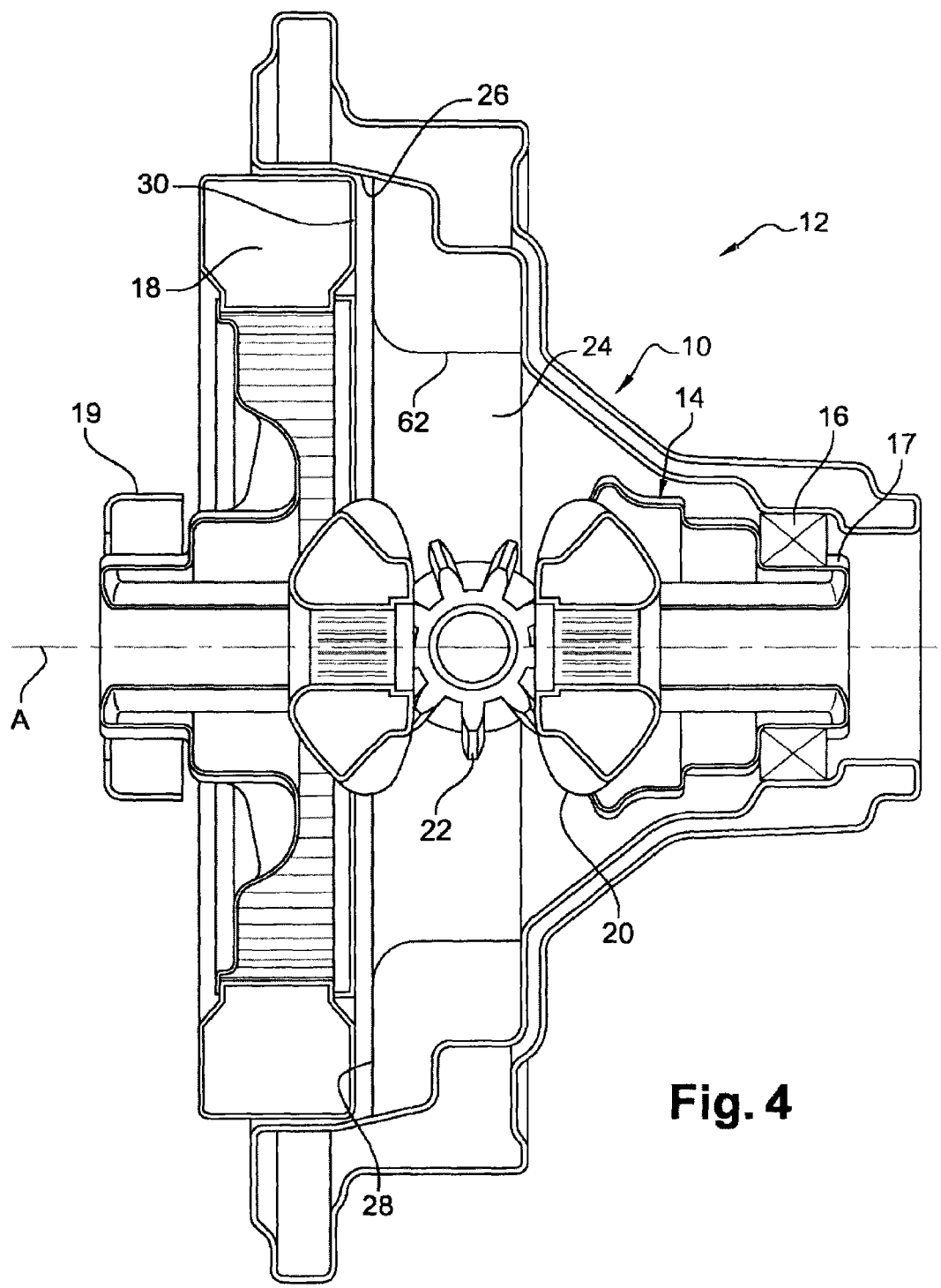
FIG. 4 is a view in axial section of the half-casing in FIG. 1 holding the differential mechanism.

A half-casing 10 of a motor vehicle differential 12 is depicted in FIG. 4.

In a manner known per se, a differential 12 includes a casing formed from two half-casings including the half-casing 10 and another half-casing (not depicted here) closing the half-casing 10. A differential mechanism 14 is supported in rotation about an axis "A" in the two half-casings by two opposing bearings.

The half-casing 10 thus includes for this purpose a first bearing 16 which is capable of receiving a first extremity 17 of the differential mechanism 14, as depicted in FIG. 4.

In a manner known per se, as illustrated by FIG. 5, the mechanism 14 includes at least one ring gear 18 adjoining a cage 20 holding planetary gears 22. The gear cage 20 is open, and it includes for this purpose windows 21 permitting the oil to penetrate there.

The half-casing 10 accommodates the cage 20 of gears 22 and at least a part of the ring gear 18.

The second half-casing (not depicted here) similarly includes a second bearing (not depicted here), which is capable of receiving the other extremity 19 of the differential mechanism 14, and which is capable of closing the first half-casing 10.

In a manner known per se, the first half-casing 10 includes at least one housing 24 capable of accommodating the cage 20 of gears 22 and of holding the lubricating oil. The housing 24 opens axially into a chamber 26, which accommodates at least a part of the ring gear 18, said chamber 26 including at least a main transverse wall 28 which is adjacent to a transverse face 30 of the ring gear 18.

The known disadvantage of such an approach, which is compliant with the prior art, is a lack of lubrication of the planetary gears 22 as soon as the differential mechanism 14 reaches high speeds of rotation.

In fact, the differential 12 is conventionally lubricated by the oil which fills said casing to a level corresponding essentially to the axis "A" of rotation of the differential mechanism 14 in such a way as to lubricate it by splashing.

As for any rotating mechanism, the oil level that is adequate for lubrication by splashing is determined as being that of the lowest rotating element, in this case being that of the differential mechanism 14.

In the course of the operation of the differential 12 at high speeds, and thus in the course of the rotation of the ring gear 18 at high speeds, the situation may arise in which the differential mechanism 14, and more specifically the ring rear 18, centrifuges the oil until it trickles on the walls of the casing, and more specifically on the walls of the half-casing 10.

This results in a deficit in the splashing oil at the level of the housing 24 and, more specifically, of the cage 20 of planetary gears 22, which may lead to a deterioration in said gears 22 and/or their bearings (not depicted here). The oil level is thus able to fall below the axis "A" in the course of the operation of the differential 12 at high speeds.

It is therefore necessary to address this difficulty by ensuring a continuous supply of oil to the cage 20 of planetary gears 22 in order to prevent their deterioration.

Figure 1:
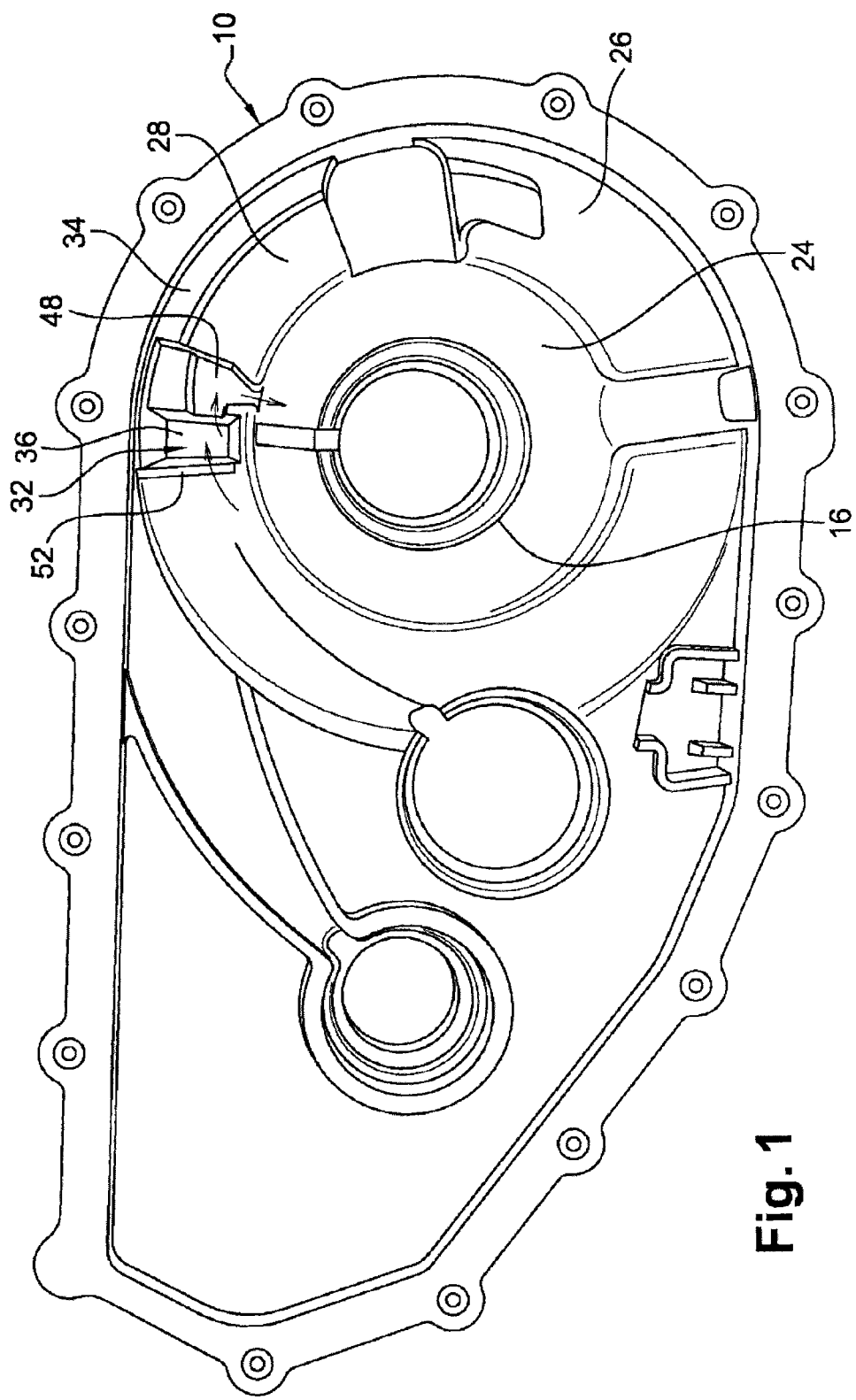
FIG. 1 is a front view of a half-casing of a differential according to the invention.

To this end, the invention proposes a motor vehicle differential 12 of the type described previously, which is characterized in that the first half-casing 10 includes a means 32 for recovering the oil that has been thrown onto the main wall 28 adjacent to the ring gear 18 by said ring gear 18, and a means 34 for redirecting the recovered oil toward the cage 20 of planetary gears 22, as illustrated in FIG. 1.

Figure 2:
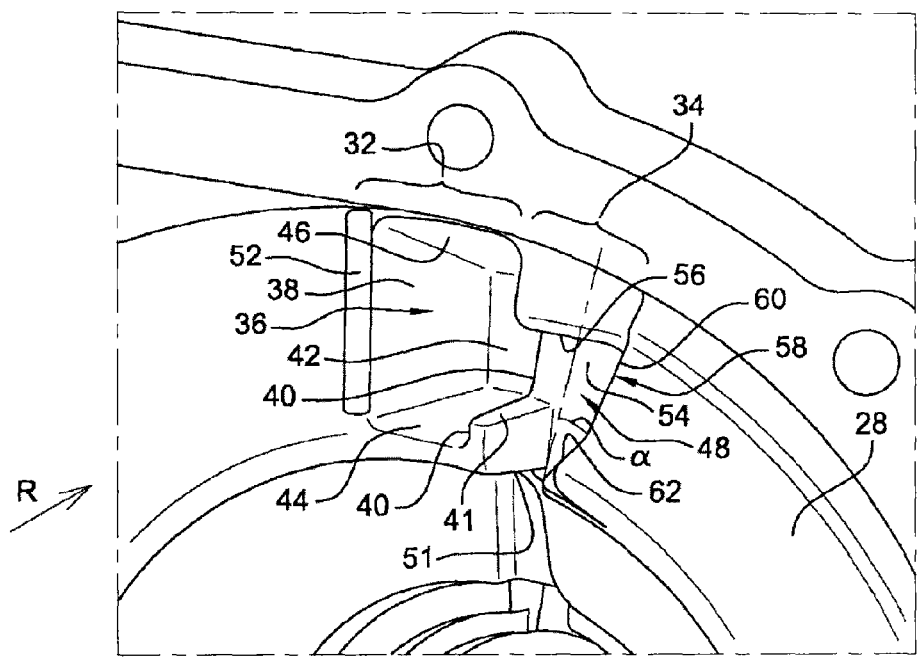
FIG. 2 is a detailed view in perspective of the means for recovering and for redirecting the oil from the half-casing in FIG. 1.
Figure 3:
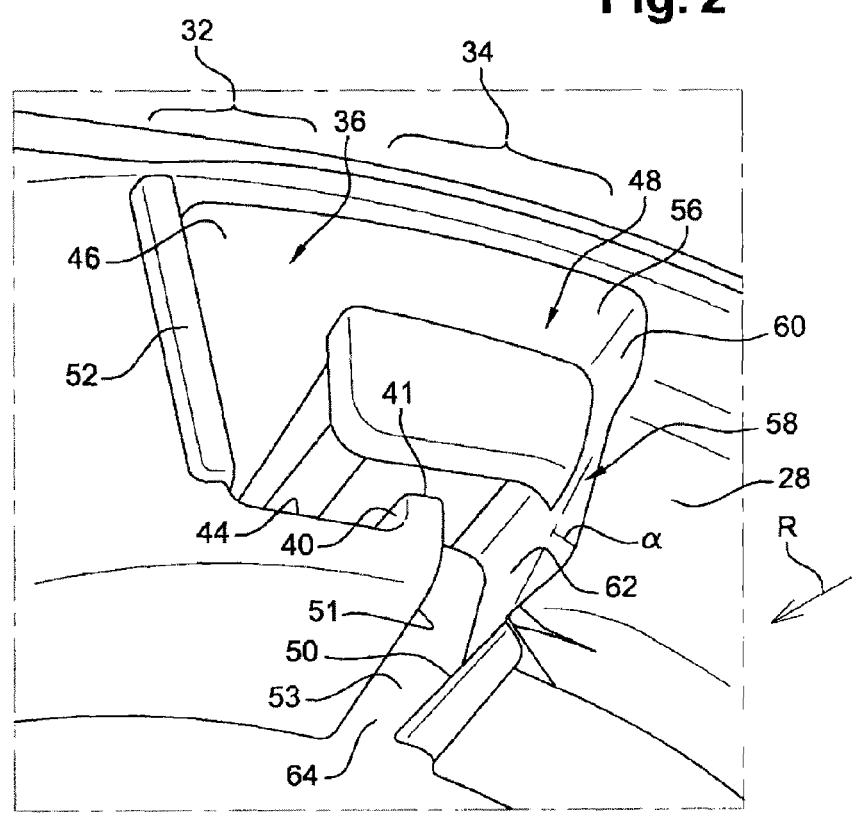
FIG. 3 is another view of the means for recovering and for redirecting the oil from the half-casing in FIG. 1.

More specifically, as illustrated in more detail by FIGS. 2 and 3, the means 32 for recovering the oil includes a first recess 36, which opens into the main wall 28, and which includes two axial radial walls 38, 40, one transverse radial wall 42 and two interior 44 and exterior 46 tangential walls, which delimit an oil reservoir.

Furthermore, the means 34 for redirecting the recovered oil includes a second recess 48, which adjoins the first recess 36, and which communicates with said first recess 36. The second recess 48 includes a passage 53 which faces toward the cage 20 of planetary gears 22.

Thus, as illustrated by the arrows in FIG. 1, the oil that is centrifuged by the ring gear 18 of the differential mechanism 14 accumulates in the first recess 36. Given that the first recess 36 communicates with the second recess 48, the accumulated oil passes into the second recess 48 and is then discharged by means of the passage 53 toward the cage 20 of planetary gears 22.

In order to permit the effective collection of the oil centrifuged by the ring gear 18, a rib 52 arranged in the extension of a first axial radial wall 38 projects from the main transverse wall 28 in order to scrape off the oil thrown by the ring gear 18, to collect it and to direct it into the reservoir of the first recess 36, the ring gear 18 rotating in an anticlockwise direction according to FIG. 1 when the vehicle is traveling in the forward direction at high speeds, in which case the ring gear 18 is able to centrifuge the lubricating oil.

In order to permit communication between the first recess 36 and the second recess 48, the second axial radial wall 40 extends radially for only a part of the radial dimension of the recess 48, in such a way that its free edge 41 delimits, together with the opposite exterior tangential wall 46, an oil passageway communicating with the second recess 48.

The second recess 48 thus communicates with the first recess 36 via this oil passageway.

In addition, the second recess 48 opens into the main wall 28.

The second recess 48 includes the second axial radial wall 40 common with the first recess 36, a transverse radial wall 54 and an exterior tangential wall 56, and it is open toward the axis of the mechanism 10 via a passage 53 which faces toward the axis of the differential mechanism 14, and which includes two edges 50, 51.

In order to channel the oil arriving from the first recess 36 toward the passage 53, as illustrated in FIG. 3, a third axial wall 58 of the second recess includes an axial radial exterior part 60 and an interior part 62 forming a predetermined angle "α" with the radial direction "R".

An interior edge of this interior part 62 coincides with at least one edge 50 of the passage 53, in such a way as to channel the oil toward the cage 20 of planetary gears 22.

Advantageously, the interior part 62 of the third axial wall 54 of the second recess 48 forms an angle "α" of substantially 10° with the radial direction "R".

Finally, the passage 53 exhibits substantially the form of a trapezoidal cutout including a tangential edge 64 and two edges 50, 51, of which the edge 50 in particular coincides with the interior edge of the interior part 62 of the third axial wall 54.

Furthermore, the interior part 62 of the third axial wall forms an angle together with the housing 24, which angle assures a vertical stream of the flow of oil emerging from the means of redirection 34.

Without this angle, the flow of oil would stream on the wall of the housing 24 and would not fall in its entirety toward the mechanism 22.

Thus, when the differential 14 rotates at a high speed, the volume of lubricant thrown under the effect of the centrifugal force is scraped off by the rib 52, thereby creating a flow of lubricant such as to fill the first recess 36. When the level of lubricant exceeds the free edge 41 of the wall 40, the oil overflows over the wall 40 before entering the second recess 48 and then falling by gravity through the passage 53 toward the differential mechanism.

In a variant of the invention (not depicted here), the cavity 32 could be connected to the rear surface of the bearing 16 by an inclined drilling, starting from the surface 36 and continuing though the half-casing 10. This configuration would permit the lubrication of the bearing 16 and the contact between the first extremity 17 of the differential mechanism 14 and the support bearing for the transmission of the torque output.

In another variant, the cavities 32 and 34 could be combined in a single cavity.

The invention thus offers an advantageous means of collecting the oil that is centrifuged by the ring gear 18 of a differential mechanism 14 in a motor vehicle differential 12, and of redirecting it toward the cage 20 of planetary gears 22, in order to ensure their lubrication, regardless of the speed of rotation of the differential mechanism 14.

The invention claimed is:

1. A motor vehicle differential comprising:
a casing and a substantially axial differential mechanism, which is supported in the casing by two opposing bearings and which includes at least one ring gear adjoining a cage of planetary gears,
the casing including a first half-casing which includes a first bearing and which is configured to accommodate the cage of gears and at least a part of the ring gear, and a second half-casing which includes a second bearing and which is configured to close the first half-casing,
the first half-casing including at least one housing configured to accommodate the cage of gears and a chamber, into which the housing opens, the chamber accommodating at least a part of the ring gear, and including at least a main transverse wall adjacent to a transverse face of the ring gear, and
the first half-casing includes:
a means for recovering oil thrown onto the wall by the ring gear comprising a first recess which is recessed to a first depth with respect to the main transverse wall, and
a means for redirecting the recovered oil toward the cage of planetary gears, said means for redirecting comprising a second recess which is recessed to a second depth with respect to the main transverse wall, said second depth being smaller than said first depth.

2. The motor vehicle differential as claimed in claim 1, wherein the first recess opens into the main transverse wall and includes two axial radial walls, one transverse radial wall, and two interior and exterior tangential walls, which delimit an oil reservoir.

3. The motor vehicle differential as claimed in claim 2, wherein the second recess is adjoining the first recess and communicating with the first recess, and includes a passage facing toward the cage of planetary gears.

4. The differential as claimed in claim 2, wherein a rib arranged in an extension of a first axial radial wall projects from the main wall to collect the thrown oil and to direct the thrown oil into the reservoir of the first recess.

5. The differential as claimed in claim 4, wherein a second axial radial wall extends radially for a reduced part of the radial dimension of the recess, to delimit, together with an opposite exterior tangential wall, an oil passageway communicating with the second recess.

6. The differential as claimed in claim 5, wherein the second recess opens into the main wall and includes:
the second axial radial wall common with the first recess as said radial wall in common,
a transverse radial wall,
an exterior tangential wall,
a passage facing toward the axis of the mechanism,
a third axial wall, which includes an axial radial exterior part and an interior part forming a predetermined angle with the radial direction, of which an interior edge coincides with at least one edge of the passage, to channel the recovered oil toward the cage of planetary gears.

7. The differential as claimed in claim 6, wherein the interior part of the third axial wall of the second recess forms an angle of substantially 10 degrees with the radial direction.

8. The differential as claimed in claim 6, wherein the passage formed in the interior tangential wall exhibits substantially a form of a trapezoidal cutout including a tangential edge and two edges, of which one coincides with the interior edge of the interior part of the third axial wall.

9. A motor vehicle differential comprising:
a casing and a substantially axial differential mechanism, which is supported in the casing by two opposing bearings and which includes at least one ring gear adjoining a cage of planetary gears,
the casing including a first half-casing which includes a first bearing and which is configured to accommodate the cage of gears and at least a part of the ring gear, and a second half-casing which includes a second bearing and which is configured to close the first half-casing,
the first half-casing including at least one housing configured to accommodate the cage of gears and a chamber, into which the housing opens, the chamber accommodating at least a part of the ring gear, and including at least a main transverse wall adjacent to a transverse face of the ring gear, and
the first half-casing includes:
a means for recovering oil thrown onto the wall by the ring gear, and
a means for redirecting the recovered oil toward the cage of planetary gears, said means for redirecting having a radial wall is common with the means for recovering,
wherein the means for recovering the oil includes a first recess, which opens into the main wall, and which includes two axial radial walls, one transverse radial wall, and two interior and exterior tangential walls, which delimit an oil reservoir.

10. A motor vehicle differential comprising:
a casing and a substantially axial differential mechanism, which is supported in the casing by two opposing bearings and which includes at least one ring gear adjoining a cage of planetary gears, the casing including a first half-casing which includes a first bearing and which is configured to accommodate the cage of gears and at least a pan of the ring gear, and a second half-casing which includes a second bearing and which is configured to close the first half-casing, the first half-casing including at least one housing configured to accommodate the cage of gears and a chamber, into which the housing opens, the chamber accommodating at least a part of the ring gear, and including at least a main transverse wall adjacent to a transverse face of the ring gear, and the first half-casing includes:

a means for recovering oil thrown onto the wall by the ring gear, and a means for redirecting the recovered oil toward the cage of planetary gears, said means for redirecting having a radial wall is common with the means for recovering, wherein the means for recovering the oil includes a first recess, which opens into the main wall, and which includes two axial radial walls, one transverse radial wall, and two interior and exterior tangential walls, which delimit an oil reservoir, wherein the means for redirecting the recovered oil includes a second recess, adjoining the first recess, communicating with the first recess, which includes a passage facing toward the cage of planetary gears.

\* \* \* \* \*